United States Patent
Kellogg

(10) Patent No.: US 9,307,746 B2
(45) Date of Patent: Apr. 12, 2016

(54) RUBBER TOY

(71) Applicant: SportPet Designs, Inc., Waukesha, WI (US)

(72) Inventor: Adam M. Kellogg, Oconomowoc, WI (US)

(73) Assignee: SportPet Designs, Inc., Waukesha, WI (US)

(*) Notice: Subject to any disclaimer, the term of this patent is extended or adjusted under 35 U.S.C. 154(b) by 89 days.

(21) Appl. No.: 14/257,345

(22) Filed: Apr. 21, 2014

(65) Prior Publication Data

US 2015/0296747 A1    Oct. 22, 2015

(51) Int. Cl.
*A01K 29/00* (2006.01)
*A01K 11/00* (2006.01)

(52) U.S. Cl.
CPC .................. *A01K 15/026* (2013.01)

(58) Field of Classification Search
CPC ... A01K 15/026; A01K 15/025; A63H 33/06; A63H 33/065
USPC .......................................................... 446/124
See application file for complete search history.

(56) References Cited

U.S. PATENT DOCUMENTS

| | | | | |
|---|---|---|---|---|
| 2,885,822 A * | 5/1959 | Onanian | ............. | A63H 33/101 174/138 D |
| 3,475,023 A | 10/1969 | Fauvelle | | |
| 3,597,874 A * | 8/1971 | Ogsbury | ............. | A63H 33/065 446/104 |
| 5,645,464 A * | 7/1997 | Chen | ............. | A63H 33/10 403/300 |
| 5,769,681 A | 6/1998 | Greenwood | | |
| 5,928,051 A | 7/1999 | Krog | | |
| 6,112,703 A * | 9/2000 | Handelsman | ........ | A01K 15/026 119/707 |
| 6,264,522 B1 * | 7/2001 | Dickson | ................ | A44C 13/00 446/102 |
| 6,966,813 B2 * | 11/2005 | Donahue | ............. | A63H 33/067 403/217 |
| 6,981,471 B1 * | 1/2006 | Dubinins | ............. | A01K 15/026 119/709 |
| 6,990,927 B2 | 1/2006 | Axelrod | | |
| 7,354,330 B2 * | 4/2008 | Bentley, Jr. | ............ | A44C 13/00 446/102 |
| 7,389,748 B2 * | 6/2008 | Shatoff | ................ | A01K 15/025 119/702 |
| 7,591,234 B2 | 9/2009 | Shatoff | | |
| 8,122,853 B2 | 2/2012 | Lind | | |
| 8,141,521 B2 * | 3/2012 | Shatoff | ................ | A01K 15/025 119/702 |
| 8,516,977 B2 | 8/2013 | Shatoff | | |
| 9,021,990 B2 * | 5/2015 | Rutherford | ......... | A01K 15/026 119/707 |
| 2006/0225667 A1 * | 10/2006 | Handelsman | ........ | A01K 15/026 119/710 |
| 2007/0077854 A1 * | 4/2007 | Jeon | .................... | A63H 33/065 446/122 |

(Continued)

FOREIGN PATENT DOCUMENTS

WO    WO 2008/100417 A3    10/2008

*Primary Examiner* — Kristen C Hayes
(74) *Attorney, Agent, or Firm* — Ryan Kromholz & Manion, S.C.

(57) ABSTRACT

A system directed to the art of rubber chew toys for pets, and dogs in particular, is provided. The rubber chew toy system has multiple rubber toy members which may be removably attached to one another. The rubber toy members have a pocket and an appendage. The appendage of one member is receivable within the pocket of another rubber member and is removable by pulling the members in opposite directions.

10 Claims, 6 Drawing Sheets

(56) References Cited

U.S. PATENT DOCUMENTS

| | | | |
|---|---|---|---|
| 2008/0141948 A1* | 6/2008 | Renforth | A01K 15/026 119/710 |
| 2009/0000565 A1 | 1/2009 | Bryce | |
| 2009/0120372 A1* | 5/2009 | Townsend | A01K 15/025 119/709 |
| 2011/0277696 A1* | 11/2011 | Rutherford | A01K 15/026 119/707 |
| 2013/0102220 A1* | 4/2013 | Wang | A63H 33/062 446/102 |
| 2013/0167780 A1* | 7/2013 | Axelrod | A01K 15/026 119/710 |
| 2013/0196568 A1* | 8/2013 | Bruder | A63H 33/062 446/124 |
| 2013/0247836 A1* | 9/2013 | Axelrod | A01K 15/026 119/709 |
| 2014/0130750 A1* | 5/2014 | Valle | A01K 15/025 119/708 |
| 2014/0345532 A1* | 11/2014 | Valle | A01K 5/0114 119/51.01 |

* cited by examiner

RUBBER TOY

BACKGROUND OF THE INVENTION

One of the many joys of dog ownership is purchasing a new toy for man's best friend and getting hours of entertainment out of the toy that is beneficial for both dog and owner alike. However, many dogs attain satisfaction from dismantling an object or toy without much thought about the mess it creates or the owner's bank account for replacing the object or toy.

Accordingly, the art of animal toys would benefit from a more durable toy that provides the ability to be repeatedly dismantled and reassembled.

SUMMARY OF THE INVENTION

The present invention relates to a more durable rubber toy that is constructed to be repeatedly dismantled and reassembled, thus providing a dog with the satisfaction of ripping something apart but not requiring the purchase of a replacement toy. The present invention comprises a plurality of rubber members, each component comprising an appendage and a pocket, whereby the appendage of one member may be repeatedly removably engaged within the pocket of another member.

One object of the present invention is to provide a rubber toy member, as part of a rubber toy system, the rubber toy member having a body with an exterior surface, a pocket within the body, an appendage extending outward from the body, and an access opening on the body opposite the appendage extending from the exterior surface to the pocket.

The appendage may have a neck portion which extends outward from the body into an interlock portion. The interlock portion may be substantially frustoconical. Additionally or alternatively, the interlock portion may have a distal end, with a distal end diameter, and a proximal end, with a proximal end diameter; the distal end diameter may be smaller than the proximal end diameter.

The access opening may have a substantially circular entrance hole with a pair of oppositely disposed slots extending radially outward from the entrance hole and along the body. The entrance hole may have a tapered entrance surface, an inner diameter at the pocket and an exterior diameter at the exterior surface of the body, wherein the inner diameter is smaller than the exterior diameter.

The pair of oppositely disposed slots may have a length of approximately the same dimension as the exterior diameter of the entrance hole.

The exterior surface may have textural features. The textural features may be at least one of a plurality of domes, a plurality of channels, or a plurality of ridges.

The pocket may extend throughout a majority of the body.

Another object of the present invention is to provide a rubber toy system having a plurality of rubber toy members, each member comprising a body having an exterior surface, a pocket within the body, an appendage extending outward from the body, and an access opening on the body opposite the appendage extending from the exterior surface to the pocket; wherein the appendage of one rubber member is removably receivable within the pocket of another rubber member.

The appendage may have a neck portion which extends outward from the body into an interlock portion. The interlock portion may be substantially frustoconical. The interlock portion may have a distal end, with a distal end diameter, and a proximal end, with a proximal end diameter; the distal end diameter may be smaller than the proximal end diameter.

The access opening may have a substantially circular entrance hole with a pair of oppositely disposed slots extending radially outward from the entrance hole and along the body.

The entrance hole may have a tapered entrance surface, an inner diameter at the pocket, and an exterior diameter at the exterior surface of the body, wherein the inner diameter is smaller than the exterior diameter.

The pair of oppositely disposed, slots may have a length of approximately the same dimension as the exterior diameter of the entrance hole.

The exterior surface may have textural features. The textural features may be at least one of a plurality of domes, a plurality of channels, or a plurality of ridges.

The plurality of rubber toy members may comprise at least one of a ring or an elongated member.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
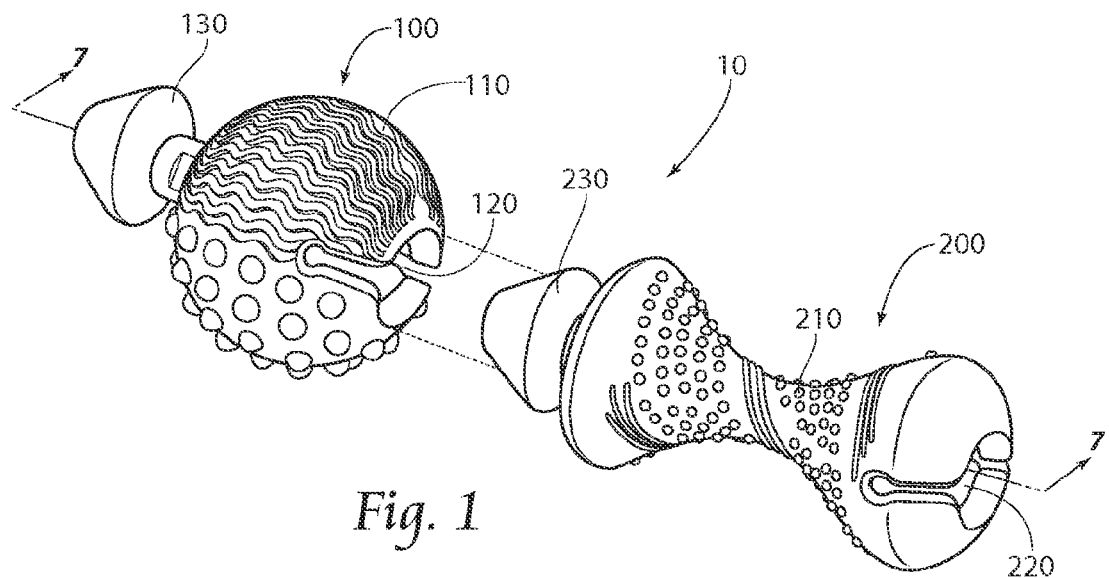
FIG. 1 is a perspective view of a rubber toy according to the present invention.

A rubber toy system 10 is illustrated in FIG. 1. The rubber toy system comprises at least a first rubber toy member 100 and a second rubber toy member 200. An embodiment of the first rubber toy member 100 and an embodiment of the second rubber toy member 200 are shown here. As discussed in further detail below, the first and second members 100 and 200 may be removably attached to each other. Each member 100, 200 comprises a body 110, 210, with a pocket 120, 220, and an appendage 130, 230 extending outward from the body 110, 210, respectively. As illustrated here, the body 110, 210 may take on various shapes, sizes, and exterior surface designs, and therefore should not be limited to just those shown here. Additionally, throughout the disclosure, similar numbers are intended to designate like elements in the various embodiments.

Figure 2:
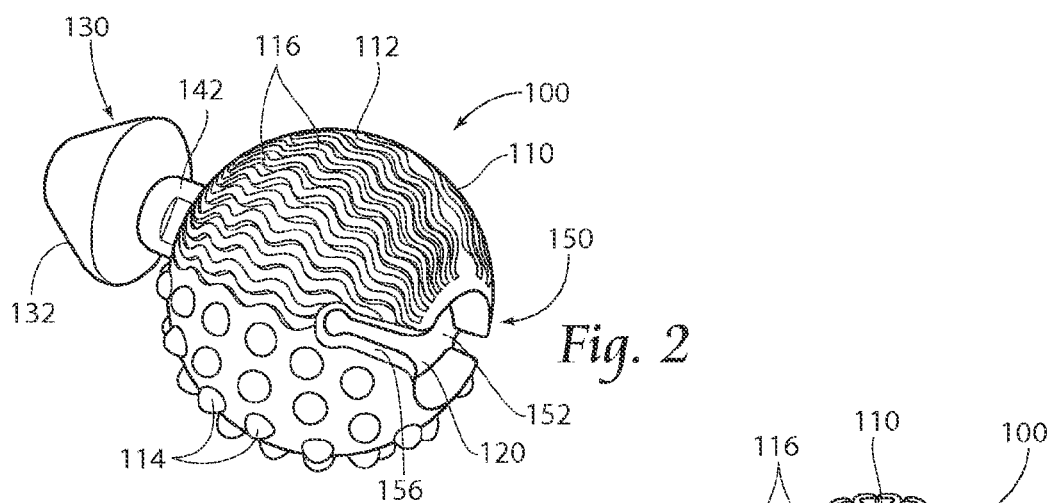
FIG. 2 is a perspective view of a first toy member according to the present invention.

FIG. 2 illustrates a perspective view of the first member 100. The body 110 of the first member 100 comprises a substantially spherical shape with an exterior surface 112, a substantially hollow interior defining the pocket 120 and a wall thickness T (see FIG. 7), and an access opening 150 providing access to the pocket 120. The exterior surface 112 may comprise textural features shown here as, but not limited to, a plurality of protruding domes 114 and/or a plurality of recessed wavy channels 116.

Looking now to FIGS. 3A-3E, side, front, rear, top, and bottom views of the first member 100 are shown. The appendage 130 has an interlock portion 132 extending from a cylindrical neck portion 142 which protrudes outwardly from the body 110. Opposite the appendage 130 is the access opening 150.

The neck portion 142 has a length L1 and a diameter D3. The neck portion length L1 is preferably substantially the same, if not slightly larger than, the wall thickness T.

The interlock portion 132 shown here is preferably substantially frustoconical; however, other shapes are within the purview of the present invention. The interlock portion 132 has a frustum cone section 134 and a convexly curved surface section 140. The frustum cone section 134 has a distal end 136 with a diameter D1 and a proximal end 138 with a diameter D2. Preferably diameter D1 is smaller than diameter D2 and the frustum cone 134 increases in diameter at a constant rate from diameter D1 to diameter D2. At the proximal end 138 of the frustum cone section 134, the appendage 130 decreases in diameter from D2 along the curved surface section 140 to the diameter D3 of the neck portion 142. As shown here, the rate of change in diameter from diameter D1 to diameter D2 is less than the rate of change in diameter from diameter D2 to diameter D3.

The access opening 150 comprises a substantially circular entrance hole 152 and a pair of oppositely disposed slots 156 extending radially outward from the entrance hole 152 and circumferentially along the body 110. The entrance hole 152 has a tapered entrance surface 154 having dimensions substantially similar to that of the frustum cone section 134. The entrance hole 152 has an inner diameter D4 of substantially approximately the same size as frustum cone diameter D1 and increases in diameter up to an exterior diameter D5 at substantially the same rate of increase as the frustum cone section 134 from distal end diameter D1 to proximal end diameter D2.

Figure 3A:
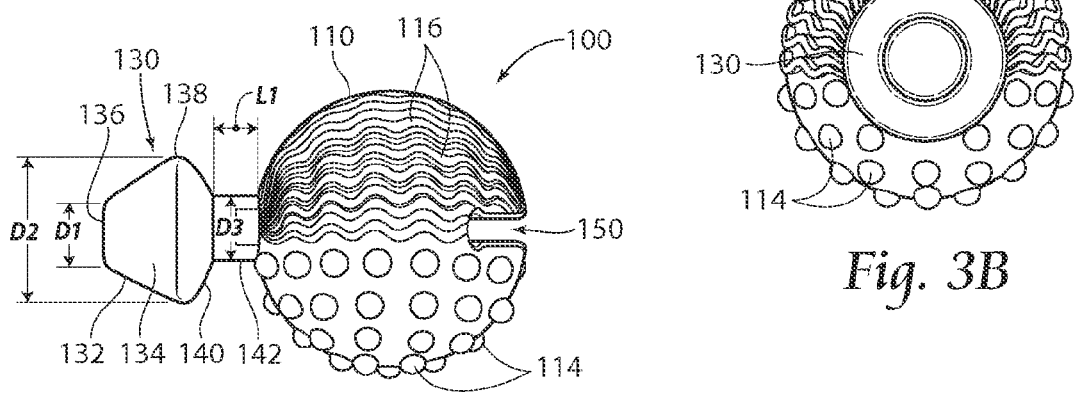
FIGS. 3A-3E are various elevation views of the rubber toy member of FIG. 2.
Figure 3B:
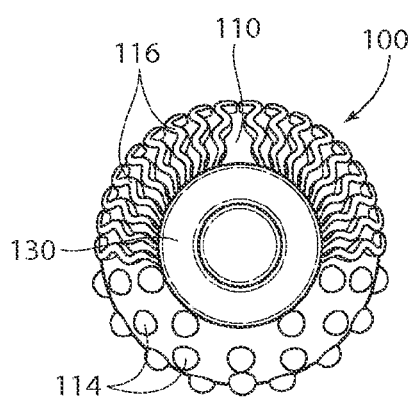
Figure 3C:
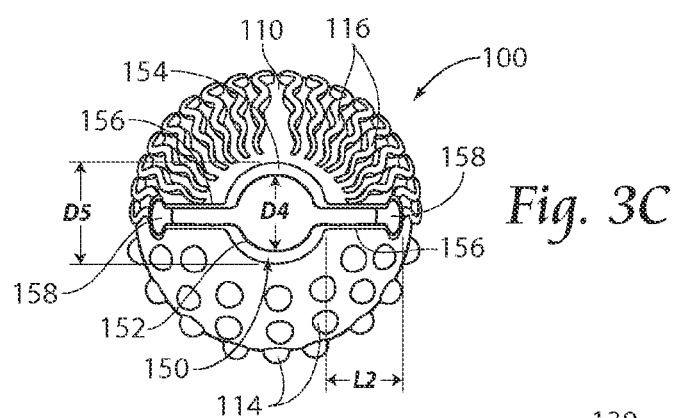
Figure 3D:
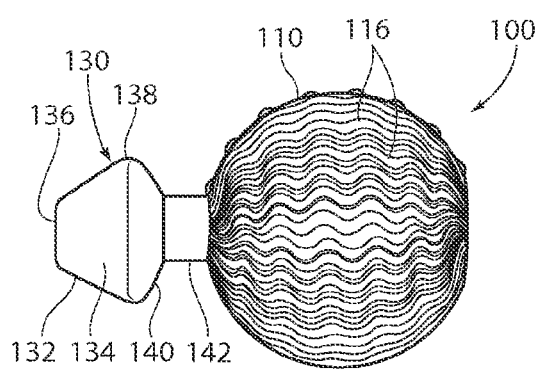
Figure 3E:
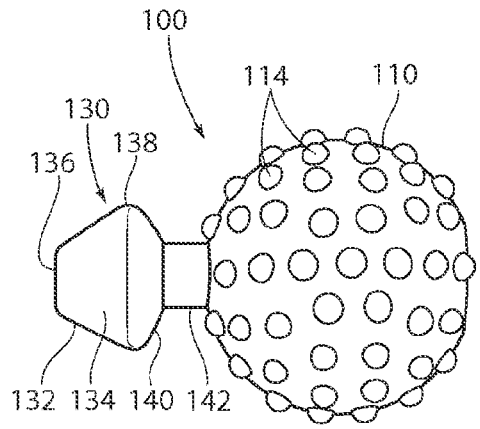
Figure 4:
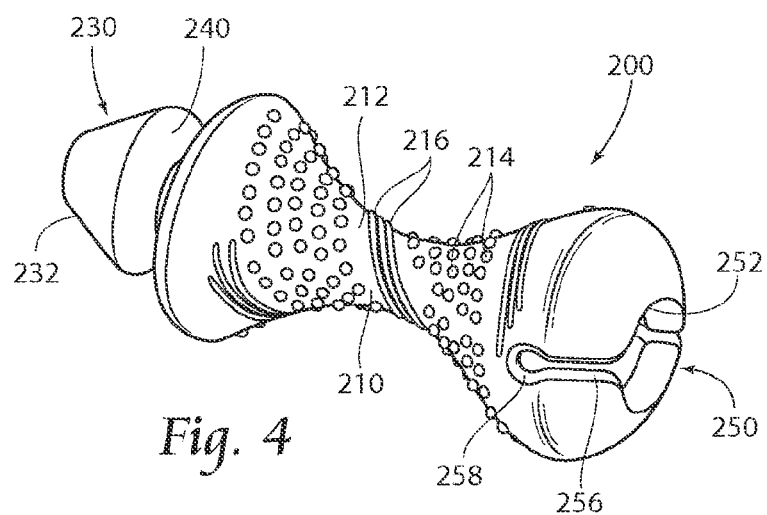
FIG. 4 is a perspective view of a second rubber toy member according to the present invention.
Figure 5A:
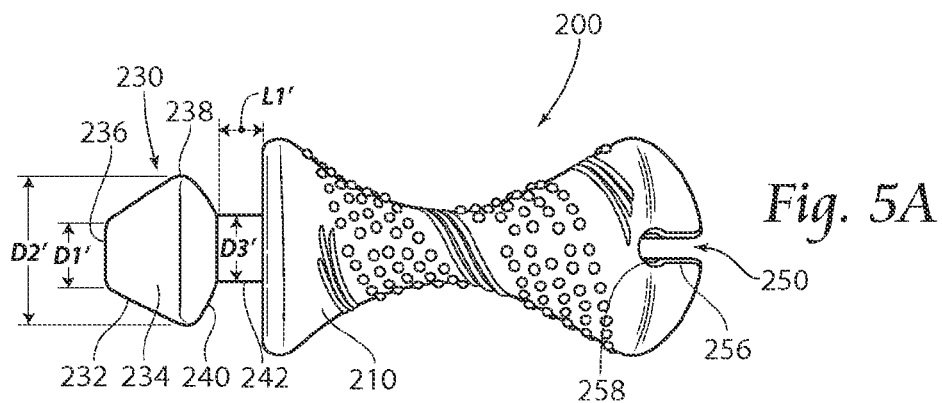
FIGS. 5A-5E are various elevation views of the rubber toy member of FIG. 4.
Figure 5B:
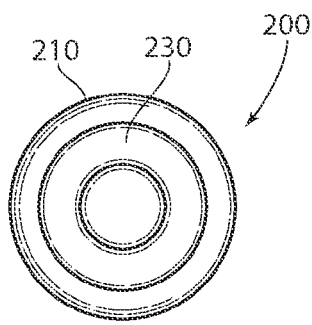
Figure 5C:
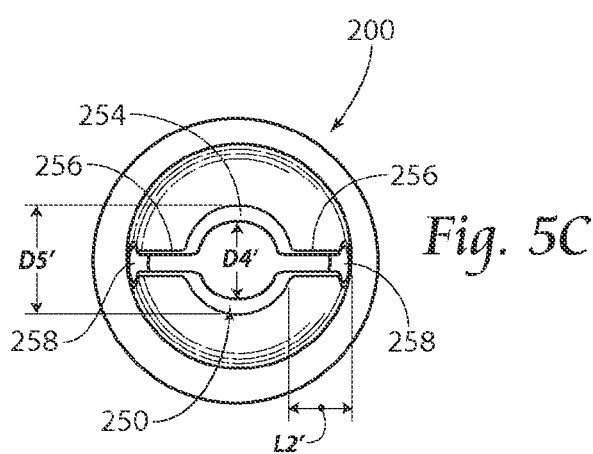
Figure 5D:
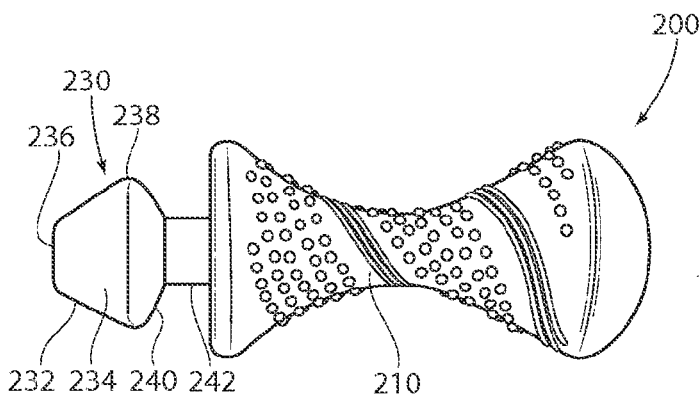
Figure 5E:
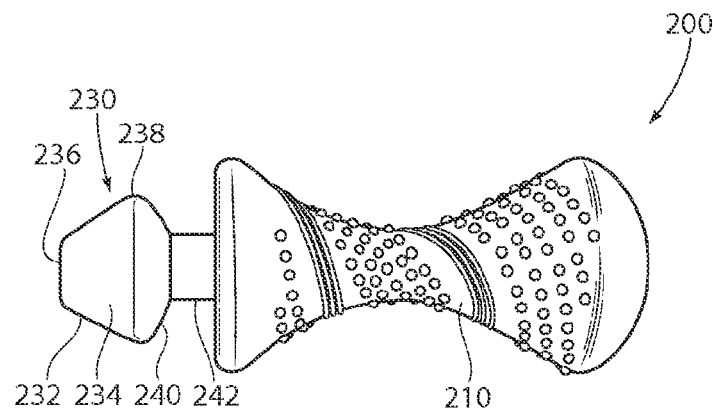

As shown in FIG. 3C, the slots 156 have a circumferential length L2 and terminate with a circular end section 158. The circumferential length L2 is preferably substantially approximately the same length as the exterior diameter D5 of the entrance hole 152; however, the circumferential length L2 may be altered based on the level of pulling force desired to decouple two coupled rubber toy members 100 and 200 (see FIGS. 7 and 8).

FIGS. 4 and 5A-5E illustrate the second member 200 in greater detail. The body 210 of the second member 200 comprises a bow-tie-like shape. The body 210 has an exterior surface 212 and may comprise textural features shown here as, but not limited to, a plurality of protruding domes 214 and/or a plurality of protruding wavy ridges 216. Similar to the first member 100, the appendage 230 extends radially outward from the body 210 of the second member 200, and opposite the appendage 230 is the access opening 250 to the pocket 220.

The appendage 230 comprises an interlock portion 232 and a neck portion 242. Similar to the first member 100, the interlock section 232 is preferably substantially frustoconical, but other shapes are within the purview of the present invention. The interlock portion 232 has a frustum cone section 234 and a convexly curved surface section 240. The frustum cone section 234 has a distal end 236 and a proximal end 238. The cylindrical neck portion 242 is also substantially similar to the neck portion 142 of the first member 100. The dimensions of the interlock portion 232 and the neck portion 242 (D1', D2', D3', L') are substantially similar to the corresponding dimensional designations of the first member appendage 130.

The access opening 250 has an entrance hole 252 with a tapered entrance surface 254, and opposing slots 256 terminating with circular end sections 258. The dimensions of the access opening 250 of the second member 200 (D4', D5', L2') are substantially similar to the corresponding dimensional designations of the first member access opening 150 discussed above.

Figure 6:
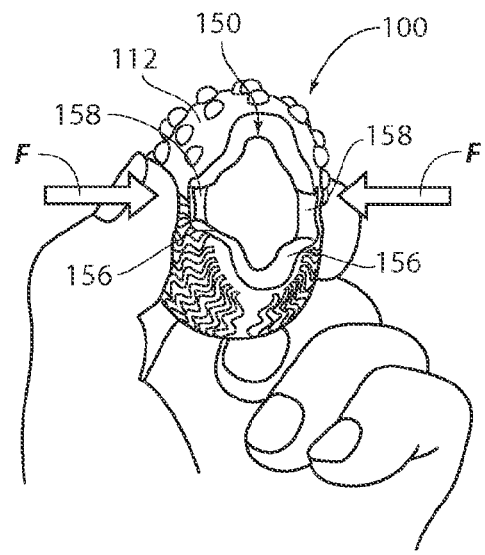
FIG. 6 is a perspective view of a force being applied to the first toy member of FIG. 2.
Figure 8:
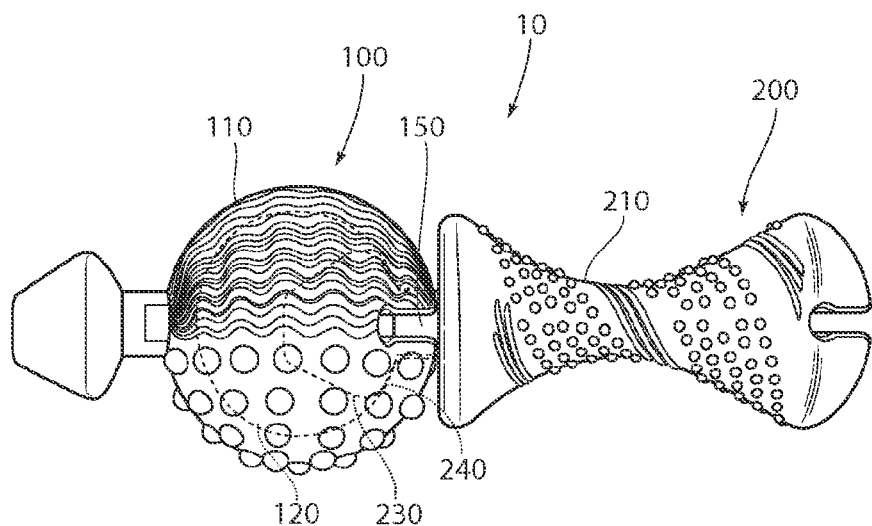
FIGS. 8 and 9 are side views depicting the coupling of the first toy member and the second toy member according to the present invention.

As shown in FIG. 6, an external force F is applied to the exterior surface 112 of the first member 100 on the same plane as the slots 156 and substantially perpendicular to the entrance hole 152. The force F brings the opposing circular end sections 158 of the slots 156 closer together and widens the slots 156. This effectively increases the diameter of the access opening 150. The now larger diameter access opening 150 allows for easier insertion of, for example, the appendage 230 of the second member 200, as shown in FIG. 8.

Accordingly, the external force F, as discussed above with respect to the first member 100 in FIG. 6, may be applied to the exterior surface 212 of the second member 100 in the same manner to achieve the same result of increasing the diameter of the access opening 250.

Figure 7:
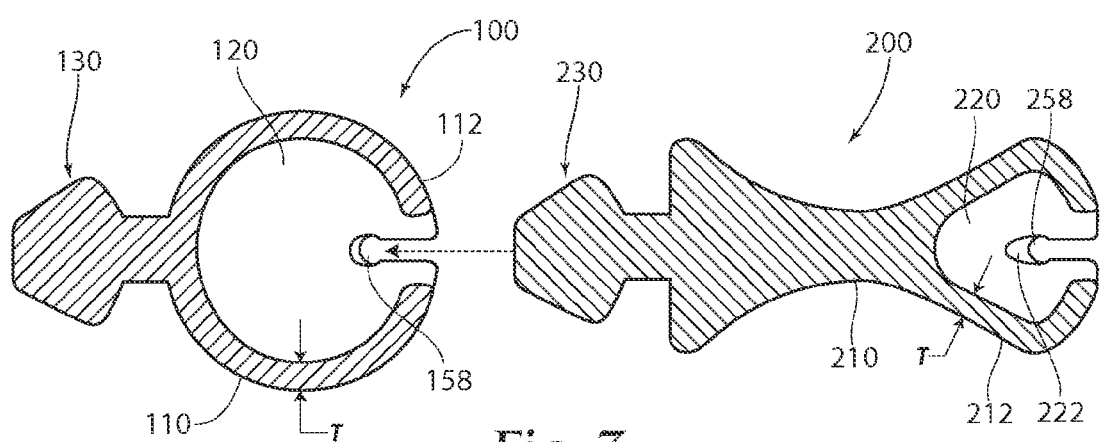
FIG. 7 is a cross-sectional view of the rubber toy along line 7-7 of FIG. 1.

FIG. 7 provides a cross-sectional view of the first and second members 100 and 200, illustrating in greater detail the pocket 120 of the first member 100 and the pocket 220 of the second member 200. As shown in the cross-section of the second member 200, the pocket 220 may comprise a notch 222 which reduces the wall thickness T from the circular end sections 258 through a portion of the pocket 220.

It can also be seen in FIG. 7 that the body 110 of the first member 100 is substantially hollow, while the majority of the body 210 of the second member 200 is solid. The body 110 of the first member 100 will provide a different tactile feedback to an animal (not shown) when bitten than will be experienced when the body 210 of the second member 200 is bitten. The substantially hollow body 110 of the first member 100 will provide a more resilient/chewy tactile feedback and the substantially solid body 210 of the second member 200 will provide a more rigid/tough tactile feedback.

Figure 9:
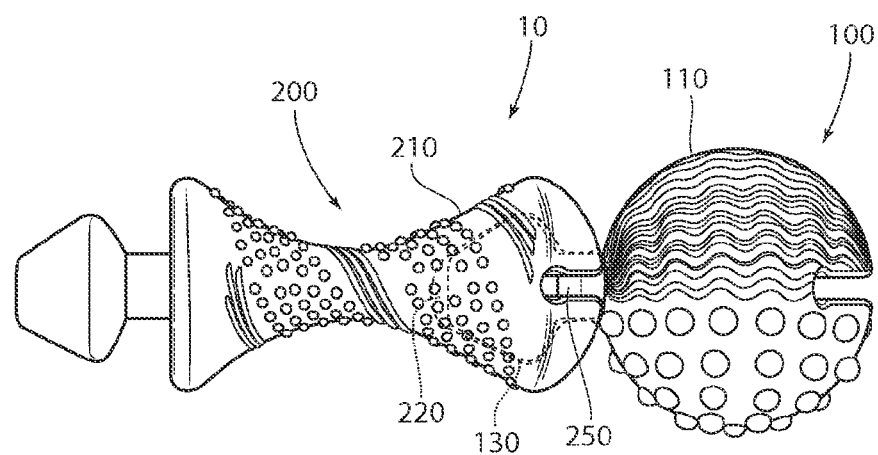

Looking to FIGS. 8 and 9 the first and second members 100 and 200 are shown attached in various arrangements. In FIG. 8, the appendage 230 of the second member 200 is positioned within the pocket 120 of the first member 100. In FIG. 9, the appendage 130 of the first member 100 is positioned in the pocket 220 of the second member 200. Additionally or alternatively, a plurality of first members 100 may be joined together in this manner and a plurality of second members 200 may be joined together in this manner. The substantially similar dimensions of the appendages 130, 230 and the pockets 120, 220 of the first and second members 100, 200, respectively, provide for numerous arrangements of the present invention.

The coupled rubber toy system of FIGS. 8 and 9 may be decoupled by pulling the members 100 and 200 apart. Looking at the rubber toy system 10 of FIG. 8 for ease of explanation, as the first and second members 100 and 200 are pulled in opposite directions, the curved surface section 240 of the appendage 230 will force the access opening 150 to open wider, allowing the appendage 230 to fully exit the pocket 120. When an external force (not shown here but similar to that shown in FIG. 6) is applied concurrently to the first member body 110, the amount of pulling force needed to separate the first and second members 100 and 200 is decreased because the access opening 150 is effectively made larger by the application of the external force to the first member body 110.

Figure 10:
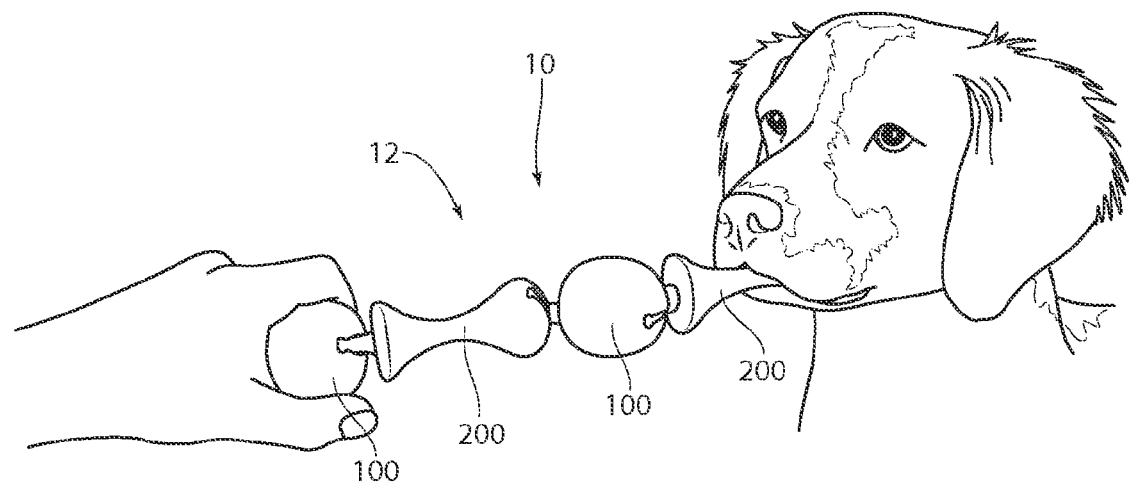
FIG. 10 is a perspective view of a plurality of rubber toy members coupled together.
Figure 11:
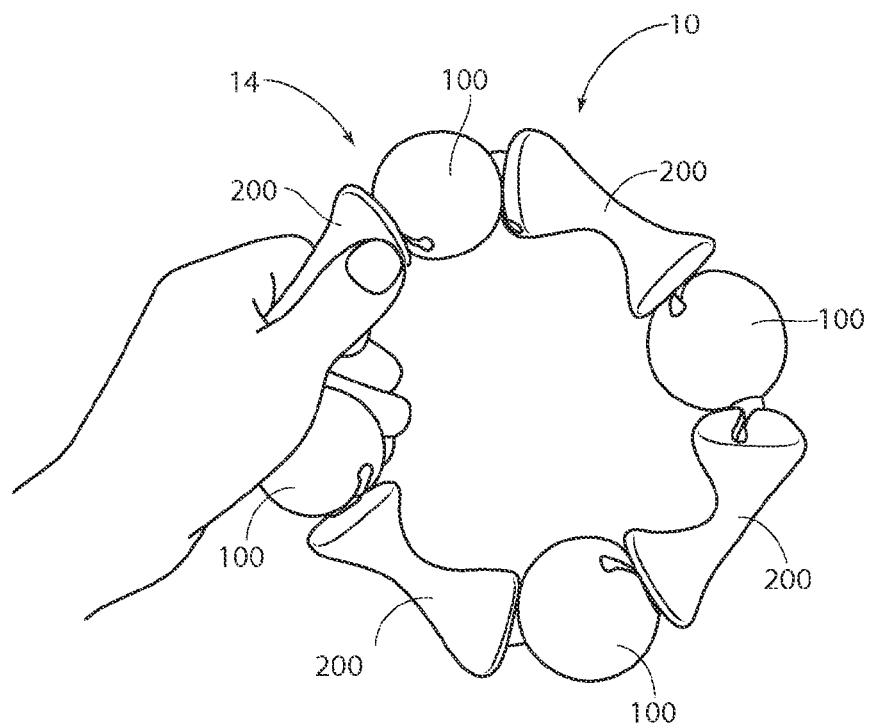
FIG. 11 is a top elevation view of a plurality of rubber toy members coupled together.

Looking now to FIGS. 10 and 11, the rubber toy system 10 is shown in multiple configurations. FIG. 10 illustrates a plurality of first and second members 100 and 200 coupled together according to the present invention to form an elongated assembly 12. The elongated assembly 12 may be used in a manner similar to a rope or a stick. Rubber toy members 100 or 200 may be added or removed to make the elongated assembly 12 longer or shorter.

FIG. 11 shows a plurality of first and second members 100 and 200 coupled together according to the present invention to form a ring assembly 14. The ring assembly 12 may be used in a manner similar to a throwing disc. Rubber toy members 100 or 200 may be added or removed to make the ring assembly 14 larger or smaller in diameter.

It should be noted that various combinations of rubber toy members 100 or 200 may be used to form the elongated assembly 12 or the ring assembly 14, and therefore should not be limited to only the configurations shown.

The foregoing is considered as illustrative only of the principles of the invention. Furthermore, since numerous modifications and changes will readily occur to chose skilled in the art, it is not desired to limit the invention to the exact construction and operation shown and described. While the preferred embodiment has been described, the details may be changed without departing from the invention, which is defined by the claims.

I claim:

1. A rubber toy system comprising:
   a plurality of rubber toy members;
   each of the plurality of rubber toy members comprising a body having an exterior surface, a pocket within the body, an appendage extending outward from the body, and an access opening on the body opposite the appendage extending inward from the exterior surface to the pocket;
   the appendage comprising a neck portion and an interlock portion, the neck portion extending outward from the body;
   the interlock portion being substantially frustoconical having a distal end, with a distal end diameter, and a proximal end, with a proximal end diameter; the distal end diameter smaller than the proximal end diameter; and
   wherein the appendage of one rubber member is removably receivable within the pocket of another rubber member.

2. The rubber toy members of claim 1, wherein the exterior surface comprises textural features.

3. The rubber toy members of claim 2, wherein the textural features comprise at least one of a plurality of domes, a plurality of channels, or a plurality of ridges.

4. The rubber toy system of claim 1, wherein the plurality of rubber toy members comprise at least one of a ring assembly or an elongated assembly.

5. A rubber toy system comprising:
   a plurality of rubber toy members;
   each of the plurality of rubber toy members comprising a body having an exterior surface, a pocket within the body, an appendage extending outward from the body, and an access opening on the body opposite the appendage extending inward from the exterior surface to the pocket;
   the access opening comprising, a substantially circular entrance hole with a pair of oppositely disposed slots extending radially outward from the entrance hole and along the body; and
   wherein the appendage of one rubber member is removably receivable within the pocket of another rubber member.

6. The access opening of claim 5, wherein the entrance hole has a tapered entrance surface, an inner diameter at the pocket, and an exterior diameter at the exterior surface of the body, wherein the inner diameter is smaller than the exterior diameter.

7. The access opening of claim 6, wherein the pair of oppositely disposed slots have a length of approximately the same dimension as the exterior diameter of the entrance hole.

8. The rubber toy members of claim 5, wherein the exterior surface comprises textural features.

9. The rubber toy members of claim 8, wherein the textural features comprise at least one of a plurality of domes, a plurality of channels, or a plurality of ridges.

10. The rubber toy system of claim 5, wherein the plurality of rubber toy members comprise at least one of a ring assembly or an elongated assembly.

* * * * *